May 18, 1954 H. J. SIEKMANN ET AL 2,678,579
WITHDRAWAL DEVICE FOR HYDRAULIC TRACERS
Filed Aug. 6, 1952 2 Sheets-Sheet 1

INVENTORS.
HAROLD J. SIEKMANN AND
GEORGE J. KASSELMANN
BY
ATTORNEY.

May 18, 1954  H. J. SIEKMANN ET AL  2,678,579
WITHDRAWAL DEVICE FOR HYDRAULIC TRACERS
Filed Aug. 6, 1952  2 Sheets-Sheet 2

INVENTORS.
HAROLD J. SIEKMANN AND
GEORGE J. KASSELMANN
BY Willard S. Grout
ATTORNEY.

Patented May 18, 1954

2,678,579

UNITED STATES PATENT OFFICE 2,678,579

WITHDRAWAL DEVICE FOR HYDRAULIC TRACERS

Harold J. Siekmann and George J. Kasselmann, Cincinnati, Ohio, assignors to the R. K. Le Blond Machine Tool Co., Cincinnati, Ohio, a corporation of Delaware Application August 6, 1952, Serial No. 302,985

1 Claim. (Cl. 82—14)

This invention pertains to improvements in hydraulic tracer controlled mechanism and is particularly directed to an automatic withdrawal device for retracting the tracer unit from the workpiece at the conclusion of the cutting cycle.

One of the objects of this invention is to provide an improved withdrawal device for a hydraulic tracer.

Another object of this invention is to provide an improved automatic trip withdrawal device operable at the end of the cutting cycle for withdrawing the tracing attachment away from the workpiece.

Still another object of this invention is to provide an improved control device for a hydraulic tracing attachment for a lathe or other machine tool which is manually operable to cause the tracing attachment to move to cutting position and which is tripped automatically at the end of the cutting cycle to withdraw the tracer from cutting position.

Still another object of this invention is to provide a manually controlled tracer finger operating device for a hydraulic tracing attachment which may be moved to an operable position to release the tracer finger of the attachment and to cause the tracer attachment to move toward the work to bring the tracer finger in contact with the control template and then to be operable further automatically at the end of the cutting cycle to trip said control device to cause it to engage the tracer finger and valve mechanism of the attachment to cause the attachment to move away from the workpiece and release the tracer finger from the control template.

Further features and advantages of this invention will appear from a detailed description of the drawings in which.

Figures 1, 3:
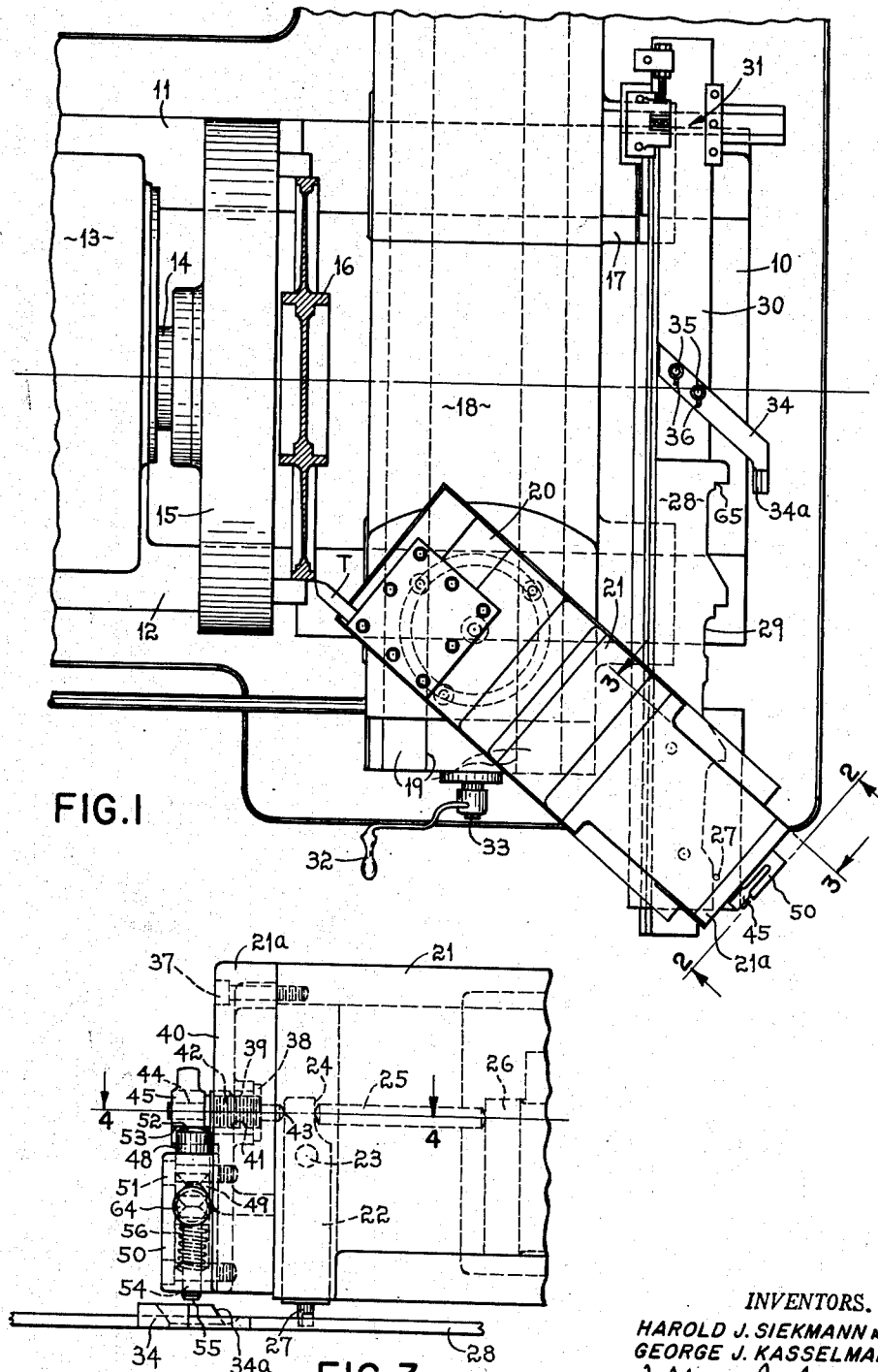
Fig. 1 is a general plan view showing one application of the withdrawal device to a hydraulic tracer applied to a lathe.
Fig. 3 is a side elevation of the apparatus shown in Fig. 2, indicated by the line 3—3 in Fig. 1.

As exemplary of one embodiment of this invention there is shown a lathe having a base or bed 10 having guideways 11 and 12 which support the headstock 13 having the spindle 14 and the work carrying face plate 15 upon which is suitably mounted the workpiece 16. A lathe carriage 17 is suitably slidably mounted on the ways 11 and 12 of the bed 10 and has a cross slide 18 mounted for transverse movement on suitable guideways 19 on the carriage 17. On top of the cross slide 18 is mounted the swivel slide 20 of the hydraulic tracer unit 21 which may preferably be of a character as shown in Patents 2,559,138 and 2,587,542.

On the front portion of the tracer unit 21 there is provided the usual tracer finger 22 pivotally mounted on a suitable rock shaft 23 and having a contact surface 24 engaging a slidable plunger 25 which in turn engages the tracer valve sleeve 26 in a manner as recited in the aforementioned patents. The tracer finger 22 has a tip 27 which engages the control template 28 having the desired contoured surface 29 to be formed on the workpiece 16. The template 28 is carried on a template bar 30 which in turn is suitably supported relative to the swivel slide 20 of the tracing attachment 21 in any well known manner as set forth in the aforementioned patents. The other end of the template bar 30 is mounted as indicated generally at 31 on suitable means connected to the lathe carriage 17 so as to allow the template freedom of movement to and from the work spindle in response to the major adjustments of the carriage on the lathe bed, but to restrict any longitudinal movement of the template bar 30 when the cross slide 18 is operated by power means or by the manual operating lever 32 connected to the cross feed screw 33, all of this construction being of well known character as recited in said aforementioned patents.

Figure 4:
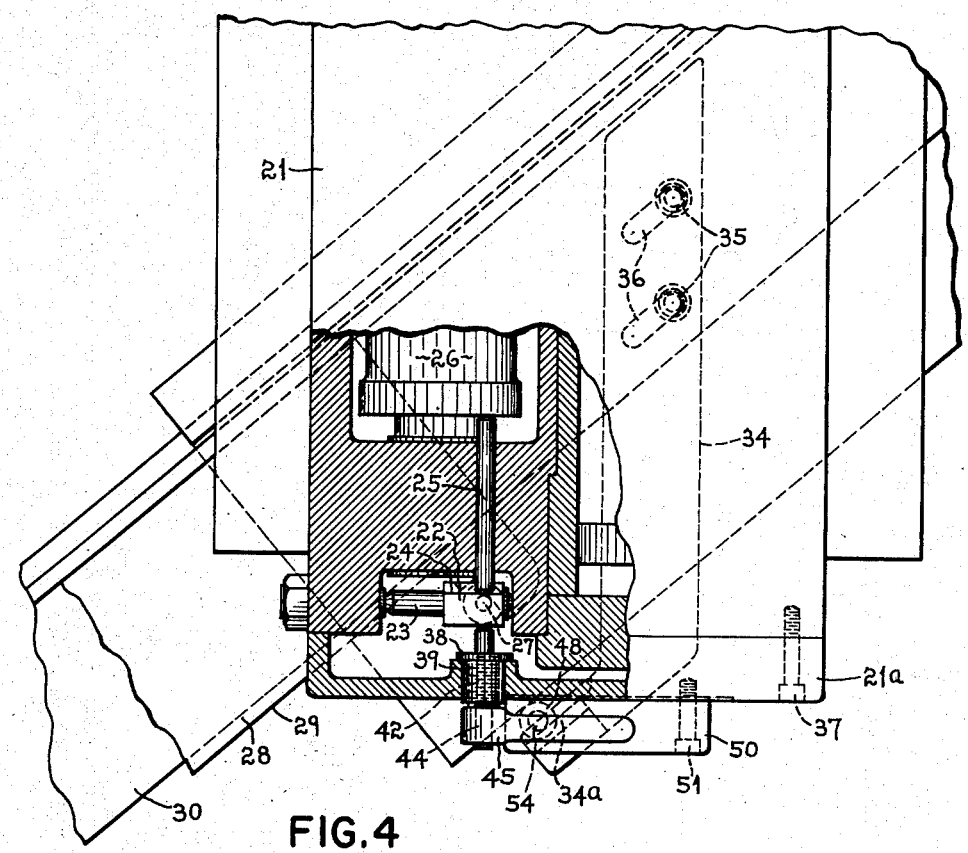
Fig. 4 is an enlarged fragmentary sectional view on the line 4—4 of Figs. 2 and 3.
Figure 2:
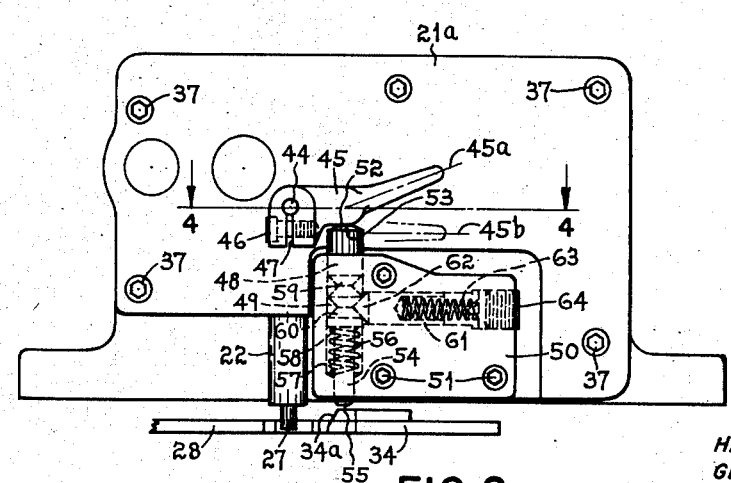
Fig. 2 is a front elevation of the control device applied to a hydraulic tracer controlled attachment, indicated by the line 2—2 of Fig. 1.

The basic object of this invention is to provide a manually operable and automatically tripped control device for the tracer control finger 22 so as to bias this finger and the control valve 26 for movement of the tracing attachment toward the workpiece 16 to bring the tip 27 in contact with the control template 28 and then at the completion of the cutting operation to automatically withdraw the tracer finger 22 from the template 28 to cause the tracing attachment 21 to move back away from the work so as to release its tool T from cutting operation on the workpiece and to at the same time withdraw the tip 27 away from any contact with the template during the return movement of the tracing attachment back to initial starting position. To this end there is provided a trip dog 34 which is adjustably mounted for longitudinal setting on the template bar 30 by means of the screws 35 passing thru the elongated slotted holes 36 in the trip dog member 34. On the outer end of the member 34 there is provided an angularly disposed cam surface 34a which provides the means for tripping the control device upon movement of the attachment and the tracer finger 22 an initial distance away from the workpiece. On a front plate 21a fixed to the front of the tracing attachment 21 by suitable screws 37 is fixed a bushing 38, Fig. 3 and Fig. 4, in the bore 39 of the front section 40 of the plate 21a. The bushing 38 has a threaded bore 41 in which is carried the rock shaft 42 having a mated threaded portion engaging with the threaded portion 41 in the bushing 38. The inner end of the rock shaft 42 is provided with an abutment surface 43 which engages the upper end of the tracer finger 22 as best seen in Fig. 3. The outer end of the rock shaft 42 has a reduced end portion 44 to which is fixed the control lever 45 by means of a clamp screw 46 and the slotted portion 47 thereof. The threaded connection at 41—42 is such that when the control lever 45 is moved from the position 45a down to the position 45b, the rock shaft 42 advances to cause its end 43 to engage the template finger 22 to move it away from the control template 28 so as to cause the attachment to move backwardly away from the workpiece. When the control lever 45 is in position 45a the rock shaft 42 is withdrawn from engagement with the tracer finger 22 to allow it to swing toward the template and thereby cause the tracer valve 26 to be so adjusted that the tracing attachment 21 moves toward the work in the machine.

Automatic control of the positions aforementioned for the control lever 45 are obtained from the trip plunger 48 which is slidably mounted in a suitable bore 49 in the block piece 50 secured to the member 21a by suitable screws 51. This plunger has an upper rounded end portion 52 which engages the abutment surface 53 of the lever 45 and on its lower end is provided a reduced portion 54 terminating in a conical end portion 55 adapted to engage the cam surface 35 on the member 34. A compression spring 56 surrounding the reduced end portion 54 abuts against the surface 57 in the bottom of the bore 49 and against the abutment surface 58 intermediate the ends of the plunger 48. A pair of annular detent grooves 59 and 60 are formed on the plunger 48 and are engaged by the spring urged detent plunger 61 having a conical point 62 engageable in each of the annular detent grooves 59 or 60. A compression spring 63 held in place by a suitable adjustable back up set screw 64 in the member 50 serves to normally continuously urge the plunger 61 toward the grooves 59 or 60 as the plunger 48 is reciprocated in the bore 49 under the influence of the control lever 45 and the return spring 56.

The thread arrangement between the members 41 and 42 is of left hand character so that when the lever 45 is in the upper position 45a its abutment end 43 will be advanced so as to engage the tracer finger 22 to move it with its tip 27 away from the template and to bias the tracer valve 26 in such a manner that the unit 21 will retract itself away from the workpiece and stay in that position at the beginning of the cutting cycle. To begin the operation, the lever 45 is depressed downwardly from position 45a to position 45b so that the detent plunger 61 now engages the slot 59 of the trip plunger 48. Downward movement of the lever 45 in the left hand thread arrangement 41—42 causes the end 43 to be moved away from the tracer finger 22 and release it so that it swings forwardly with its tip 27 moving toward the template. The unit 21 then feeds into cutting position and comes to rest at the desired position upon contact of the tip 27 with the template 28 in a well known manner. The carriage 18 is then power or hand fed across the work 16 to the completion thereof whereupon a surface 65 on the template 28 engages the tip 27 of the tracer finger 22 to move it rearwardly around the pivot 23 to cause the valve 26 to be shifted for normal tracer controlled withdrawal of the tool slide 22 an initial distance until the tip 55 of the plunger 48 engages the cam surface 34a on the trip dog 34. The inner engagement of the parts 55—34a forces the plunger 48 upwardly so that the detent plunger 61 then drops into the annular detent groove 60 and at the same time forces the control lever 45 upwardly from position 45b to position 45a. This causes the end 43 of the rock shaft 42 to again engage the tracer finger to hold it permanently in withdrawn position so that now the tracer controlled slide 21 continues to move back to retracted position away from the work independent of the template. While thus held in this position the cross slide may be reversed in its travel to bring the tool slide 21 back to original starting position as shown in Fig. 1.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention what is claimed as new and novel and is desired to be obtained by United States Letters Patent is:

In a withdrawal device for a tracing attachment, a front plate fixed to said tracing attachment, a horizontally disposed bushing fixed in said front plate having a threaded bore therein, a rock shaft, a threaded diameter portion on said rock shaft operatively fitting in said threaded bore in said bushing, a vertically disposed abutment surface on the inner end of said rock shaft adapted to engage the tracer finger of said tracing attachment, a control lever fixed to the outer end of said rock shaft, a clamp screw carried in said lever to bind said control lever on said rock shaft whereby swinging of said control lever causes axial displacement of said rock shaft in said bushing, a block piece fixed to said front plate, a vertically disposed trip plunger slidably mounted in said block piece, a rounded abutment surface on the upper end of said trip plunger, an abutment surface on the underside of said control lever engaged by said abutment surface on the upper end of said trip plunger, a conical end surface on the lower portion of said trip plunger adapted to be engaged by a trip dog fixed on the machine structure carrying said tracing attachment, a compression spring surrounding said trip plunger, an abutment surface on said block piece engaging the lower end of said compression spring, an abutment surface on said trip plunger engaging the upper end of said compression spring, a pair of axially spaced annular detent grooves formed on said trip plunger above said compression spring, a horizontally disposed detent plunger slidably in said block piece radially of said trip plunger, a conical point formed on the inner end of said detent plunger adapted to enter either of said annular detent grooves, and a second compression spring acting between the other end of said detent plunger from its conical point and said block piece.

References Cited in the file of this patent

UNITED STATES PATENTS

| Number | Name | Date |
| --- | --- | --- |
| 2,167,790 | Whitehead | Aug. 1, 1939 |
| 2,373,265 | Salisbury | Apr. 10, 1945 |
| 2,576,817 | Waterson | Nov. 27, 1951 |
| 2,601,345 | Turchan | June 24, 1952 |